US 8,249,588 B2

(12) United States Patent
Cheng (10) Patent No.: US 8,249,588 B2
(45) Date of Patent: Aug. 21, 2012

(54) METHOD, NETWORK DEVICE, AND NETWORK SYSTEM FOR IMPLEMENTING VOICE CALL CONTINUITY SERVICE

(75) Inventor: Yihua Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/980,890

(22) Filed: Dec. 29, 2010

(65) Prior Publication Data

US 2011/0092199 A1    Apr. 21, 2011

Related U.S. Application Data

(63) Continuation of application No. PCT/CN2009/072758, filed on Jul. 14, 2009.

(30) Foreign Application Priority Data

Jul. 21, 2008    (CN) .......................... 2008 1 0132173

(51) Int. Cl.
*H04W 4/00* (2009.01)
*H04L 12/66* (2006.01)
(52) U.S. Cl. .................. 455/432.3; 455/432.1; 370/352
(58) Field of Classification Search ....... 455/432.1–433, 455/436–445; 370/352
See application file for complete search history.

(56) References Cited

U.S. PATENT DOCUMENTS

2007/0097879 A1* 5/2007 Bleckert et al. ............... 370/254
2007/0217354 A1* 9/2007 Buckley ......................... 370/328
2007/0281669 A1* 12/2007 Jiang ........................... 455/414.1

FOREIGN PATENT DOCUMENTS

| CN | 1627855 A | 6/2005 |
| CN | 1665314 A | 9/2005 |
| EP | 2073479 A1 | 6/2009 |
| KR | 20080015357 A | 2/2008 |
| WO | WO 2010/009658 A1 | 1/2010 |

OTHER PUBLICATIONS

Written Opinion of the International Searching Authority issued in corresponding PCT Patent Application No. PCT/CN2009/072758, mailed Sep. 3, 2009.
Extended European Search Report issued in corresponding European Patent Application No. 09799973.4, mailed Jun. 30, 2011.

(Continued)

*Primary Examiner* — Matthew Sams
(74) *Attorney, Agent, or Firm* — Brinks Hofer Gilson & Lione (57) ABSTRACT

A method, network device, and network system for implementing the Voice Call Continuity (VCC) service are provided. The method includes: receiving an Initial Detection Point (IDP) message from a Mobile Switching Center (MSC); querying whether an address of a Service Control Point (SCP) of a user is null; if the address of the SCP is not null, sending the IDP message to the SCP and interacting with the SCP; and detecting whether a subsequent message from the SCP is a Connect or Continue message; if the subsequent message from the SCP is the Connect or Continue message, copying the Connect or Continue message to a new Connect message and sending the new Connect message to the MSC for implementing the VCC service. According to the present invention, a new SCPvcc is used to support the VCC service, thus implementing the VCC service for all mobile users.

12 Claims, 8 Drawing Sheets

OTHER PUBLICATIONS

Kühne et al., "Charging in the IP Multimedia Subsystem: A Tutorial", IEEE Communications Magazine, Jul. 2007.

Orange et al., "Transferring TS 23.206 into Release-8 Specifications Especially into ICS and Service Continuity TS", 9.7.3. 3GPP TSG SA WG2 Meeting #62, Marina Del Rey, California. Jan. 14-18, 2008.

Global System for Mobile Communications, "3$^{rd}$ Generation Partnership Project; Technical Specification Group Services and System Aspects; Voice Call Continuity (VCC) Between Circuit Switched (CS) and IP Multimedia Subsystem (IMS)" Stage 2 (Release 7), 3GPP TS 23.206. v7.5.0, Dec. 2007. XP-002643004.

3$^{rd}$ Generation Partnership Project; Technical Specification Group Services and System Aspects; Voice Call Continuity (VCC) between Circuit Switched (CS) and IP Multimedia Subsystem (IMS); Stage 2 (Release 7). 3GPP TS 23.206, V2.0. Mar. 2007.

3$^{rd}$ Generation Partnership Project; Technical Specification Group Core Network and Terminals; Voice Call Continuity between the Circuit-Switched (CS) domain and the IP Multimedia Core Network (CN) (IMS) subsystem; Stage 3 (Release 7). V7.1.0, Mar. 2007.

* cited by examiner

METHOD, NETWORK DEVICE, AND NETWORK SYSTEM FOR IMPLEMENTING VOICE CALL CONTINUITY SERVICE

CROSS-REFERENCE TO RELATED APPLICATIONS

This application is a continuation of International Application No. PCT/CN2009/072758, filed on Jul. 14, 2009, which claims priority to Chinese Patent Application No. 200810132173.3, filed on Jul. 21, 2008, both of which are hereby incorporated by reference in their entireties.

FIELD OF THE INVENTION

The present invention relates to a communication technology, and in particular, to a method, network device, and network system for implementing a Voice Call Continuity (VCC) service.

BACKGROUND OF THE INVENTION

The 3rd Generation Partnership Project (3GPP) defines specifications of the method and apparatus for implementing VCC in 3GPP Rel 7 (see TS 23.206 and TS 24.206), and supports seamless handover of mobile users between a Circuit Switched (CS) domain and a Packet Switched (PS) domain.

However, the specifications do not support the existing Intelligent Network (IN) users of the Global System for Mobile Communications (GSM)/Universal Mobile Telecommunications System (UMTS), and the VCC service is implemented for only non-IN users.

At the initial deployment of the IP Multimedia Subsystem (IMS), 2nd Generation (2G)/3rd Generation (3G) users in the existing network account for a large percentage, while new IMS users account for a small percentage. Therefore, if the existing GSM/UMTS IN users are not supported, the VCC service is hard to implement.

Figure 1:
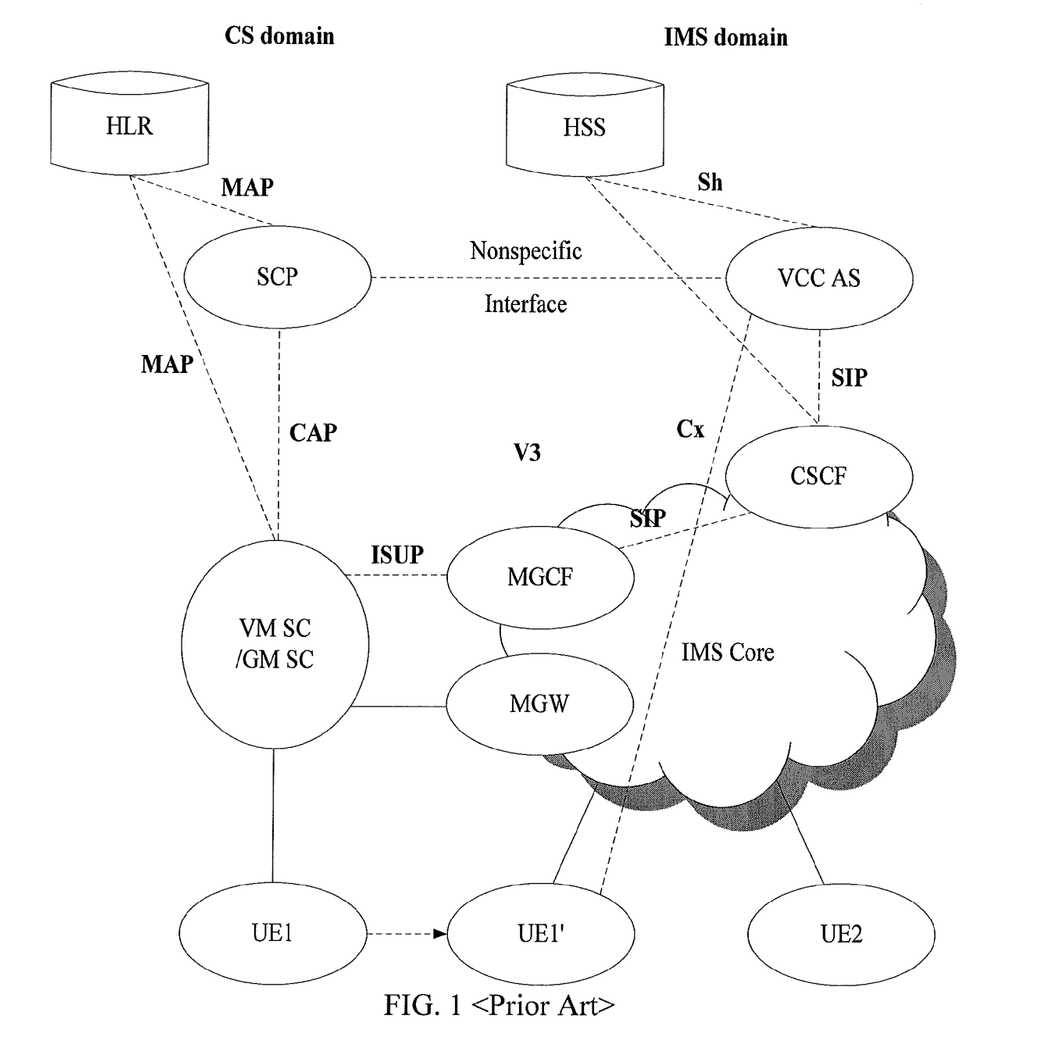
FIG. 1 shows a networking diagram of a VCC service system in the prior art.

The 3GPP defines a reference model for implementing the VCC service in 3GPP TS 23.206. FIG. 1 shows a networking diagram of a VCC service system in the prior art. In FIG. 1, the Home Location Register (HLR) and the Home Subscriber Server (HSS) are set independently; in the actual deployment, an operator can integrate the HLR with the HSS according to the capabilities of devices.

During the implementation of the present invention, the inventor finds at least the following problems in the prior art:

For each mobile operator, the percentage of prepaid users is high (more than 70% or even more than 95% for some operators); the prepaid service and other IN services such as the Virtual Private Network (VPN) run on the Service Control Point (SCP), and the users of such services have subscribed to an IN service. In the foregoing solution, a user requesting the VCC service must subscribe to the VCC service, but the mobile IN protocol does not support subscribing to two IN services concurrently. Therefore, the solution implements the VCC service for only the mobile users who have not subscribed to the IN service. Because the percentage of the mobile users who have not subscribed to the IN service is small, the implementation of the VCC service is limited greatly.

The interface between the SCP and the VCC Application Server (AS) is added. If the SCP is used to implement the VCC service, the SCP software of the existing network needs to be upgraded, which will affect the IN service carried by the SCP of the existing network.

The interface between the SCP and the VCC AS is not defined, and interconnection between the VCC AS and the SCP of the existing network needs to be tested. When the VCC AS and the SCP are from different manufacturers, the interconnection may fail.

SUMMARY OF THE INVENTION

Embodiments of the present invention provide a method, network device, and network system for implementing the VCC service and use a new SCPvcc to support the VCC service, thus simplifying the interconnection with devices of the existing network, decreasing upgrades or modifications on devices of the existing network, and reducing the impact on services of the existing network.

A method for implementing a VCC service includes:
receiving an Initial Detection Point (IDP) message from a Mobile Switching Center (MSC);
querying whether an address of an SCP of a user is null;
if the address of the SCP is not null, sending the IDP message to the SCP and interacting with the SCP; and
detecting whether a subsequent message from the SCP is a Connect or Continue message; if so, copying the Connect or Continue message to a new Connect message and sending the new Connect message to the MSC for implementing the VCC service.

A network device includes:
a querying module, adapted to query whether an address of an SCP of a user is null;
a sending module, adapted to send an IDP message to the SCP if the querying module finds that the address of the SCP is not null;
a detecting module, adapted to detect whether a subsequent message sent from the SCP is a Connect or Continue message; and
a copying module, adapted to copy the Connect or Continue message to a new Connect message sent to an MSC if the detecting module detects that the subsequent message sent from the SCP is the Connect or Continue message, so as to implement a VCC service.

A network system includes:
an MSC, adapted to: send an IDP message to an SCPvcc and receive a new Connect message from the SCPvcc;
the SCPvcc, adapted to: receive the IDP message from the MSC; query whether an address of an SCP of a user is null, and if the address of the SCP is not null, send the IDP message to the SCP; detect whether a subsequent message from the SCP is a Connect or Continue message, and if the subsequent message from the SCP is the Connect or Continue message, copy the Connect or Continue message to the new Connect message and send the new Connect message to the MSC; and
the SCP, adapted to: receive the IDP message sent from the SCPvcc, and send the subsequent message to the SCPvcc according to the IDP message.

The technical solution provided in the embodiments of the present invention has at least the following merits: The new SCPvcc is used to support the VCC service, thus implementing the VCC service for all mobile users, simplifying the interconnection with devices of the existing network, decreasing upgrades or modifications on devices of the existing network, and reducing the impact on services of the existing network.

BRIEF DESCRIPTION OF THE DRAWINGS

To make the technical solution of the present invention clearer, the accompanying drawings for illustrating the embodiments of the present invention or the prior art are outlined below. Apparently, the accompanying drawings are exemplary only, and persons having ordinary skill in the art can derive other drawings from such accompanying drawings without any creative effort.

DETAILED DESCRIPTION OF THE EMBODIMENTS

The technical solution of the present invention is detailed below with reference to accompanying drawings. Apparently, the embodiments described below are exemplary only, without covering all embodiments of the present invention. Those skilled in the art can derive other embodiments from the embodiments given herein without making any creative effort, and all such embodiments are covered in the protection scope of the present invention.

The present invention is hereinafter described in detail with reference to the accompanying drawings and exemplary embodiments.

In the VCC service system in an embodiment of the present invention, a network element may be added to provide the VCC service and may be compatible with functions of the SCP.

Figure 2:
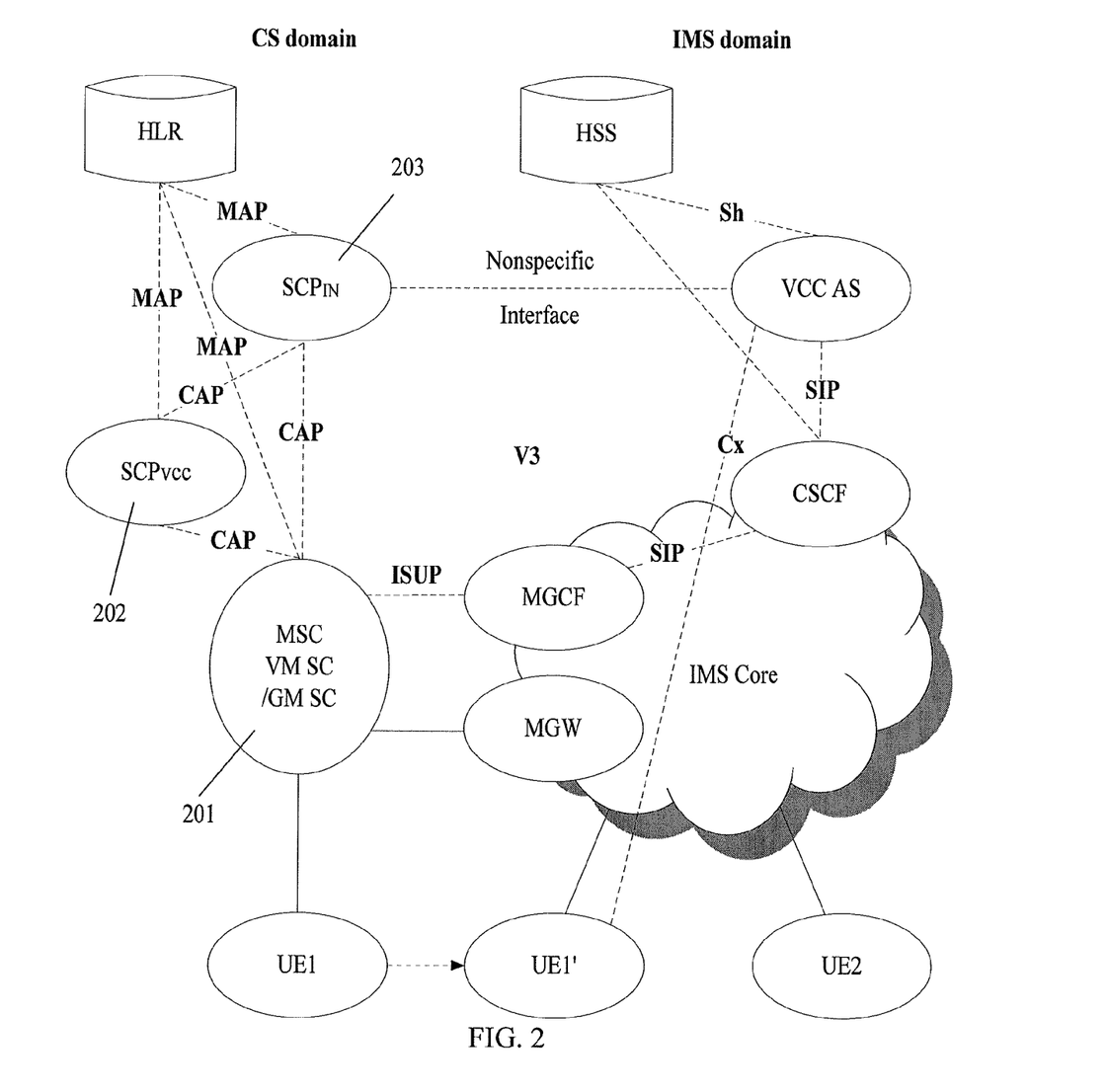
FIG. 2 shows a networking diagram of a VCC service system in an embodiment of the present invention.

FIG. 2 shows a networking diagram of a VCC service system in an embodiment of the present invention. The VCC service system includes:

an MSC 201, adapted to: send an IDP message to an SCPvcc (Service Control Point for Voice Call Continuity) 202 and receive a new Connect message from the SCPvcc 202;

the SCPvcc 202, adapted to: receive the IDP message from the MSC 201; query whether an address of an SCP of a user is null, and if the address of the SCP is not null, send the IDP message to an SCP 203; detect whether a subsequent message from the SCP 203 is a Connect or Continue message, and if the subsequent message from the SCP 203 is the Connect or Continue message, copy the Connect or Continue message to the new Connect message and send the new Connect message to the MSC 201; and the SCP 203, adapted to: receive the IDP message sent from the SCPvcc 202, and send the subsequent message to the SCPvcc according to the IDP message.

For ease of subsequent descriptions, the SCP (the SCP 203) that provides IN services for mobile users (including prepaid and postpaid users) in the existing network is referred to as an SCPin, and the new network element (the SCPvcc 202) that provides the VCC service and is compatible with functions of the SCP is referred to as an SCPvcc; the CAMEL Application Part (CAP) protocol may be used between the SCPvcc and the Visited Mobile Switching Center (VMSC)/SCPin of the existing network, and the Mobile Application Part (MAP) protocol may be used between the SCPvcc and the HLR.

In actual deployment, the foregoing SCPin (the SCP 203) and the SCPvcc (the SCPvcc 202) may be set in the network system independently or integrated into one; that is, if the upgraded SCPin of the existing network supports the SCPvcc function, the SCPin and the SCPvcc may be integrated, and the upgraded SCP provides both the existing IN service and the VCC service.

Figure 3:
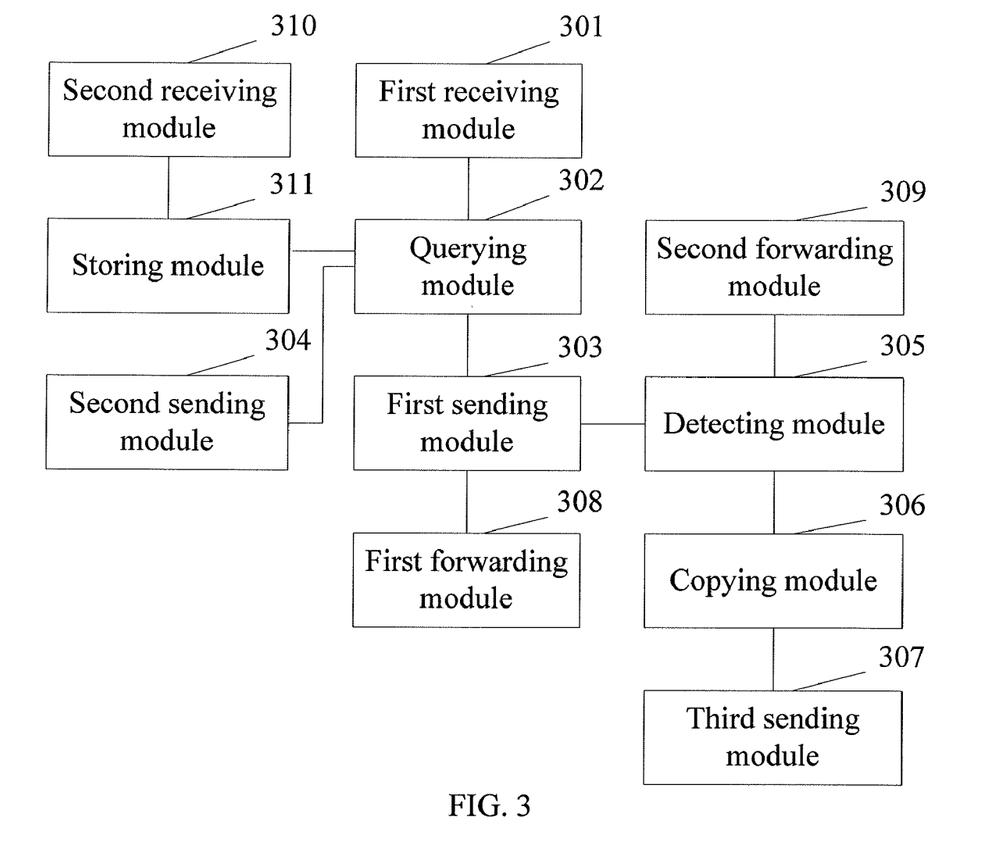
FIG. 3 shows a structure of an SCPvcc in an embodiment of the present invention.

FIG. 3 shows a structure of an SCPvcc in an embodiment of the present invention. The SCPvcc includes:

a first receiving module 301, adapted to receive an IDP message sent from an MSC;

a querying module 302, adapted to query a storing module 311 to determine whether an address of an SCP of a user is null after the first receiving module 301 receives the IDP message from the MSC;

a first sending module 303, adapted to: if the querying module 302 finds that the address of the SCP is not null, send the IDP message to the SCP, and interact with the SCP;

a second sending module 304, adapted to send a Connect message to the MSC for implementing a VCC service if the querying module 302 finds that the address of the SCP is null;

a detecting module 305, adapted to detect whether a subsequent message sent from the SCP is a Connect or Continue message after the first sending module 303 sends the IDP message to the SCP;

a copying module 306, adapted to copy parameters in the Connect or Continue message to a new Connect message sent to the MSC for implementing the VCC service if the detecting module 305 detects that the subsequent message sent by the SCP is the Connect or Continue message;

a third sending module 307, adapted to send the new Connect message to the MSC after the copying module 306 copies the Connect or Continue message to the new Connect message;

a first forwarding module 308, adapted to forward the subsequent message sent from the MSC to the SCP after the first sending module 303 sends the IDP message to the SCP;

a second forwarding module 309, adapted to forward the subsequent message sent from the SCP to the MSC if the detecting module 305 detects that the subsequent message is not the Connect or Continue message;

a second receiving module 310, adapted to receive subscription information and the address of the SCP of the user from a Business & Operation Support System (BOSS); and the storing module 311, adapted to store the address of the SCP of the user received by the second receiving module 310. The storing module may be a database.

With the network device provided in the embodiment of the present invention, the new SCPvcc is used to support the VCC service, thus implementing the VCC service for all mobile users, simplifying the interconnection with devices of the existing network, decreasing upgrades or modifications on devices of the existing network, and reducing the impact on services of the existing network.

Figure 4:
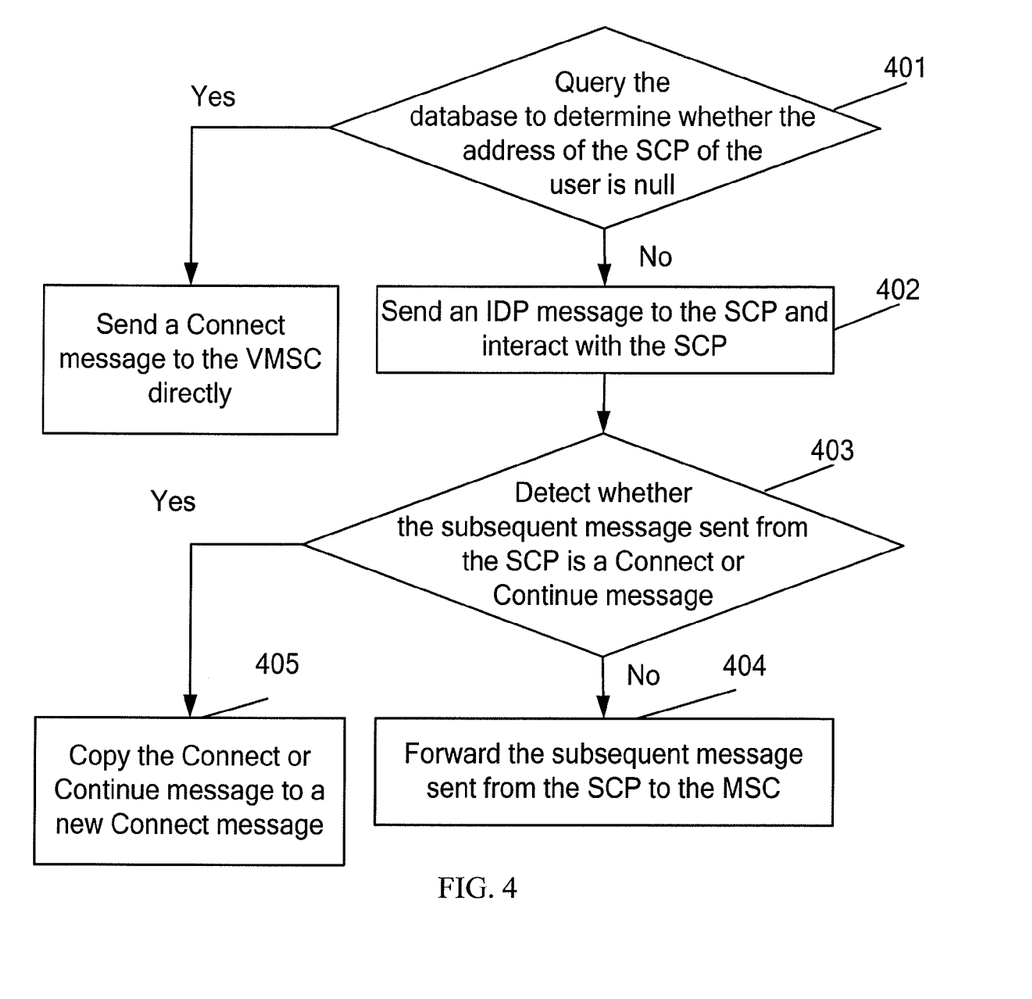
FIG. 4 shows a flowchart of a method for implementing a VCC service in an embodiment of the present invention.

FIG. 4 shows a flowchart of a method for implementing a VCC service in an embodiment of the present invention. The method includes the following steps:

Step 401: Query the database to determine whether the address of the SCP of the user is null.

If the address of the SCP is null, send a Connect message to the VMSC directly; if the address of the SCP is not null, perform step 402.

Before querying the database to determine whether the address of the SCP of the user is null, receive an IDP message sent from the MSC. If the user has not subscribed to any IN service, the address of the SCP of the user is null.

Step 402: Send an IDP message to the SCP and interact with the SCP.

If the user has subscribed to an IN service, the address of the SCP of the user is not null; in this case, send an IDP message to the SCP and interact with the SCP.

Step 403: Detect whether a subsequent message sent from the SCP is a Connect or Continue message; if so, perform step 405; otherwise, perform step 404.

Step 404: Forward the subsequent message sent from the SCP to the MSC.

Step 405: Copy the Connect or Continue message to a new Connect message.

If the subsequent message sent from the SCP is a Connect or Continue message, copy the Connect or Continue message to the new Connect message, and send the new Connect message to the MSC for implementing the VCC service.

With the method for implementing the VCC service in the embodiment of the present invention, the new SCPvcc is used to support the VCC service, thus implementing the VCC service for all mobile users, simplifying the interconnection with devices of the existing network, decreasing upgrades or modifications on devices of the existing network, and reducing the impact on services of the existing network.

Figure 5:
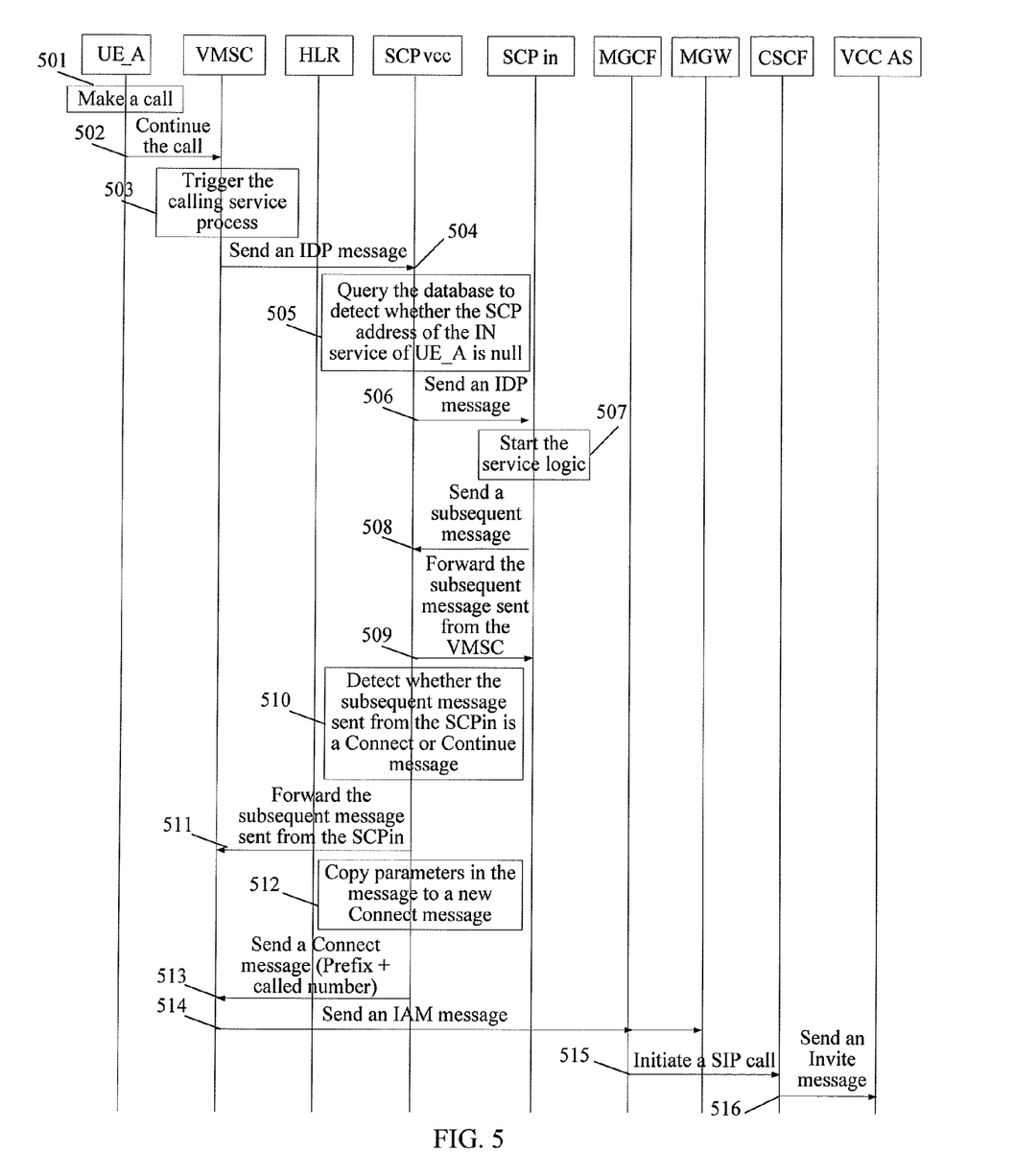
FIG. 5 shows a flowchart of a method for implementing a VCC service in an embodiment of the present invention.

FIG. 5 shows a flowchart where a VCC user is a caller in the CS domain in an embodiment of the present invention. The flowchart includes the following steps:

Step 501: A User Equipment (UE_A) makes a call.

Step 502: The UE continues the call to the VMSC.

Step 503: The VMSC triggers the calling service process.

Step 504: The VMSC sends an IDP message to the SCPvcc.

Step 505: After receiving the IDP message, the SCPvcc queries the database to detect whether the address of the SCP of the IN service (SCPin) of UE_A is null; if the address of the SCP is null, the SCPvcc performs step 513; otherwise, the SCPvcc performs step 506.

Step 506: The SCPvcc copies parameters in the IDP message received from the VMSC, and sends the IDP message to the SCPin of UE_A.

Step 507: After receiving the IDP message, the SCPin starts the service logic.

Step 508: The SCPin sends a subsequent message to the SCPvcc.

Step 509: The SCPvcc forwards the subsequent message sent from the VMSC to the SCPin directly.

Step 510: The SCPvcc detects whether the subsequent message sent from the SCPin is a Connect or Continue message; if not, the SCPvcc performs step 511; otherwise, the SCPvcc performs step 512.

Step 511: The SCPvcc forwards the subsequent message sent from the SCPin to the VMSC directly.

Step 512: The SCPvcc copies parameters in the message to a new Connect message.

Step 513: The SCPvcc adds a prefix before the called number and sends a Connect message to the VMSC. The prefix is used to instruct the VMSC to route the call to the Media Gateway Control Function (MGCF) & Media Gateway (MGW) for anchoring, and is specified by the operator at the time of implementing a service.

Step 514: After receiving the Connect message, the VMSC sends an Initial Address Message (IAM) to the MGCF & MGW according to the called number Prefix+B in the Connect message, and sets up a bearer link to the MGCF & MGW.

Step 515: After receiving the IAM message, the MGCF initiates a Session Initiation Protocol (SIP) call to the Call Session Control Function (CSCF), and routes the call to the CSCF and VCC AS for anchoring.

Step 516: The CSCF determines that the call is a VCC call according to the called number Prefix+B in the Invite message from the MGCF, and sends an Invite message to the VCC AS for anchoring.

In the process described in the embodiment of the present invention, the called UE is in the PS domain. If the called UE is in the CS domain, the process is the same as the foregoing process.

Figure 6:
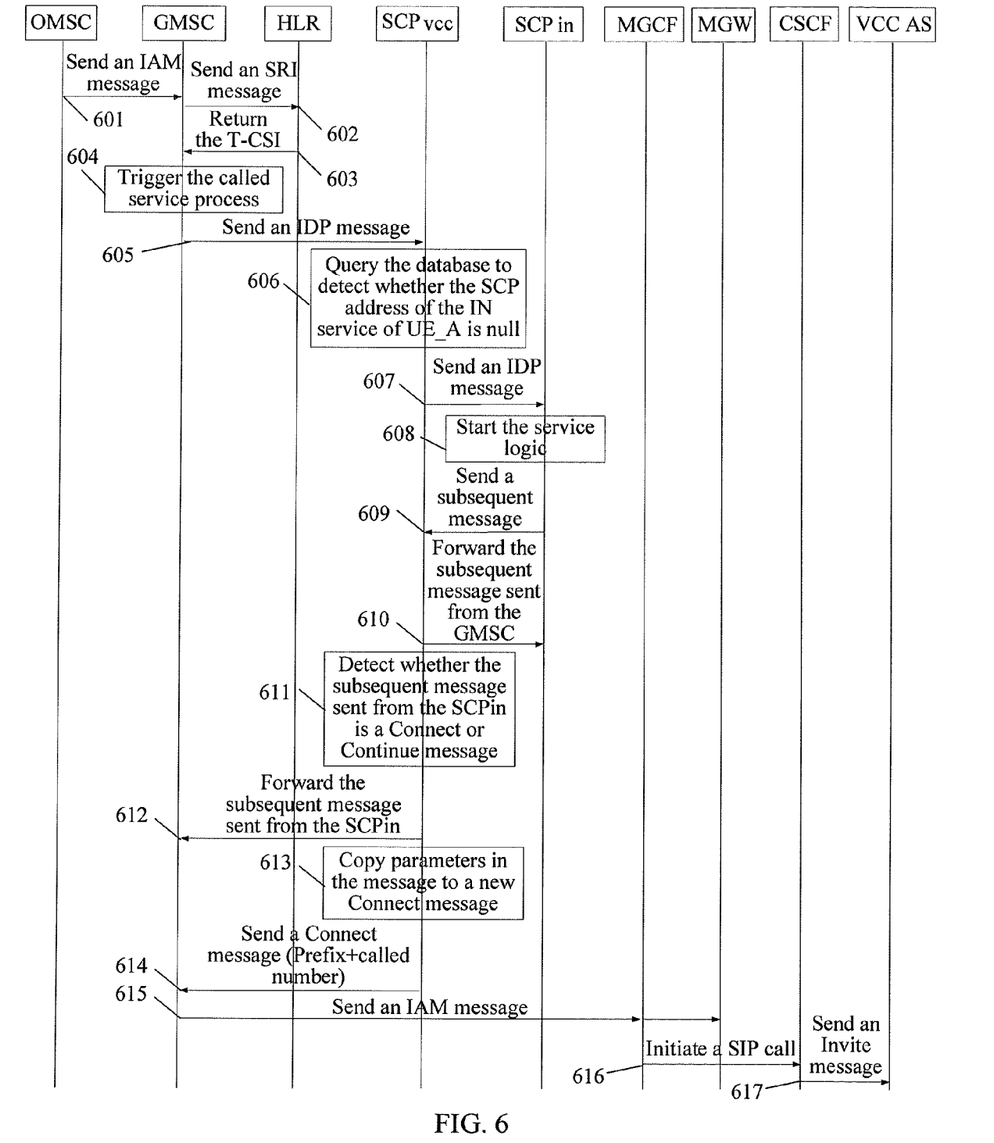
FIG. 6 shows a flowchart of another method for implementing a VCC service in an embodiment of the present invention.

FIG. 6 shows a flowchart where a VCC user is called in the CS domain in an embodiment of the present invention. The flowchart includes the following steps:

Step 601: The Gateway Mobile Switching Center (GMSC) receives an IAM message for setting up a call from the Originating Mobile Switching Center (OMSC).

Step 602: The GMSC sends a Send Routing Information (SRI) message to the HLR to query roaming information of the called user.

Step 603: The HLR returns the Termination-CAMEL Subscription Information (T-CSI) to the GMSC.

Step 604: The GMSC triggers the called service process.

Step 605: The GMSC sends an IDP message to the SCPvcc.

Step 606: After receiving the IDP message, the SCPvcc queries the database to detect whether the address of the SCP of the IN service of UE_A is null; if the address of the SCP is null, the SCPvcc performs step 613; otherwise, the SCPvcc performs step 607.

Step 607: The SCPvcc copies parameters in the IDP message received from the GMSC, and sends the IDP message to the SCPin of UE_B.

Step 608: After receiving the IDP message, the SCPin starts the service logic to parse the message.

Step 609: The SCPin sends a subsequent message to the SCPvcc.

Step 610: The SCPvcc forwards the subsequent message sent from the GMSC to the SCPin directly.

Step 611: The SCPvcc detects whether the subsequent message sent from the SCPin is a Connect or Continue message; if not, the SCPvcc performs step 612; otherwise, the SCPvcc performs step 613.

Step 612: The SCPvcc forwards the subsequent message sent from the SCPin to the GMSC directly or indirectly.

Step 613: The SCPvcc copies parameters in the Connect or Continue message to a new Connect message.

Step 614: The SCPvcc adds a prefix before the called number, and sends a Connect message to the GMSC.

The prefix is used to instruct the GMSC to route the call to the MGCF & MGW for anchoring, and may be specified by the operator at the time of implementing a service.

Step 615: After receiving the Connect message, the GMSC sends an JAM message to the MGCF & MGW according to the called number Prefix+B in the Connect message, and sets up a bearer link to the MGCF & MGW.

Step 616: After receiving the IAM message, the MGCF initiates a SIP call to the CSCF, and routes the call to the CSCF and VCC AS for anchoring.

Step 617: The CSCF determines that the call is a VCC call according to the called number Prefix+B in the Invite message from the MGCF, and sends an Invite message to the VCC AS for anchoring.

In the process described in the embodiment of the present invention, the calling UE is in the CS domain. If the calling UE is in the PS domain, the call is continued to the CS domain for processing, and the process is the same as the foregoing process.

In the processes of the foregoing two embodiments, the flow charts illustrate for the situations that the VCC user is a calling user and a called user respectively. If both the calling user and called user are VCC users and both of them are located in the CS domain, the processes described in the two embodiments are implemented continuously. That is, the process where the VCC user is a calling user in the CS domain is performed first, and then the process where the VCC user is a called user in the CS domain is performed. This variation also falls within the protection scope of the present invention.

With the method provided in the embodiment of the present invention, the new SCPvcc is used to support the VCC service, thus implementing the VCC service for all mobile users, simplifying the interconnection with devices of the existing network, decreasing upgrades or modifications on devices of the existing network, and reducing the impact on services of the existing network.

Figure 7:
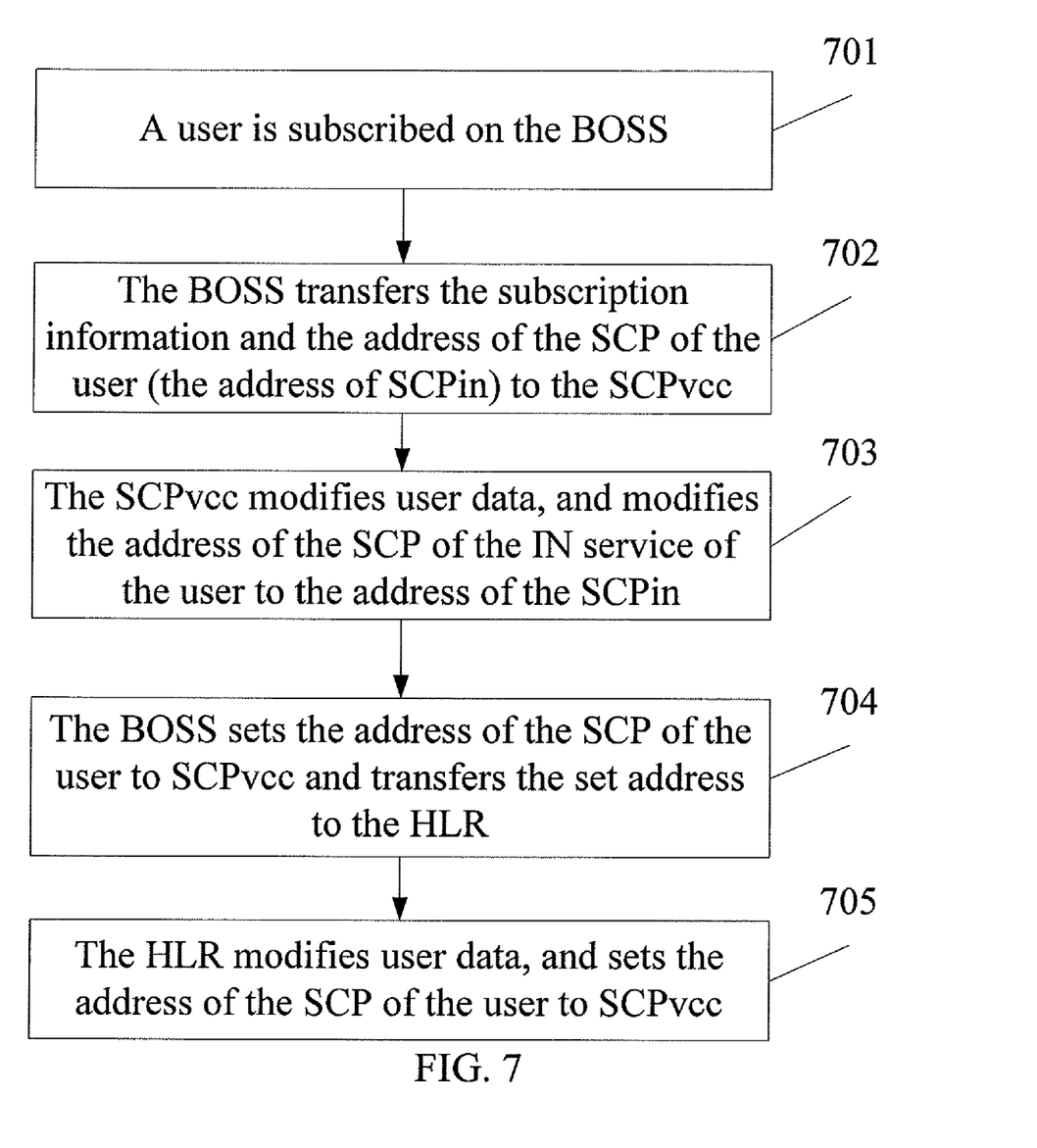
FIG. 7 shows a flowchart of VCC service subscription in an embodiment of the present invention.

FIG. 7 shows a flowchart of VCC service subscription in an embodiment of the present invention. The flowchart includes the following steps:

Step 701: A user is registered on the BOSS. This step may be performed by an operator or a user.

Step 702: The BOSS transfers the subscription information and the address of the SCP of the user (the address of the SCPin) to the SCPvcc.

If the user has not subscribed to any IN service, the address of the SCP of the user (the address of the SCPin) is set to null. The interface or protocol between the BOSS and the SCPin or SCPvcc is the interface or protocol of the existing network.

Step 703: The SCPvcc modifies user data, and modifies the address of the SCP of the IN service of the user to the address of the SCPin.

Step 704: The BOSS sets the address of the SCP of the user to SCPvcc and transfers the set address to the HLR.

Step 705: The HLR modifies user data, and sets the address of the SCP of the user to SCPvcc.

With the network device provided in the embodiment of the present invention, a new SCPvcc is used to support the VCC service, thus enabling fast implementation and deployment, decreasing upgrades or modifications on devices of the existing network, simplifying the interconnection with devices of the existing network, imposing no restriction on whether a user has subscribed to an IN service, and implementing the VCC service for all mobile users.

Figure 8:
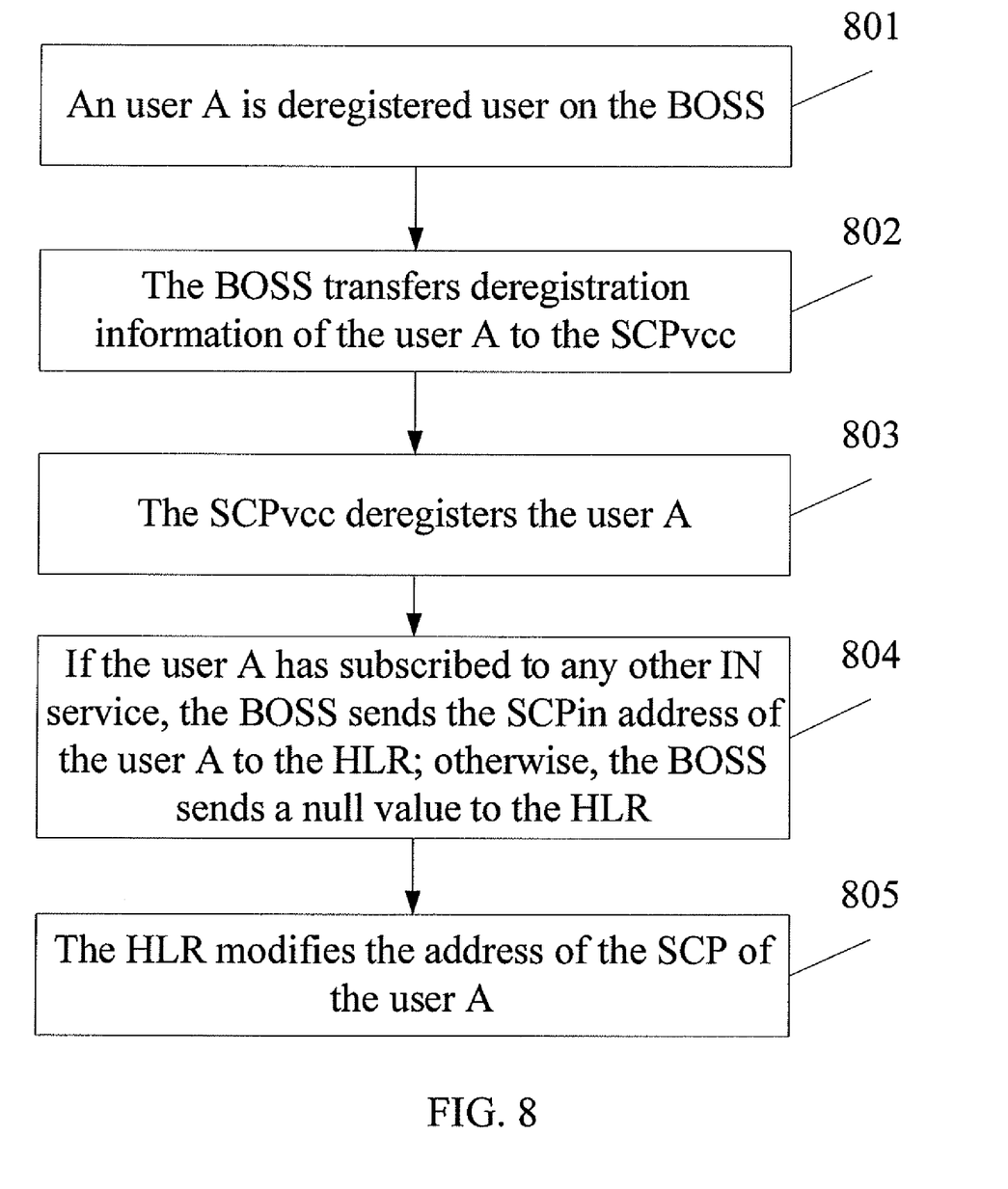
FIG. 8 shows a flowchart of VCC service deregistration in an embodiment of the present invention.

FIG. 8 shows a flowchart of VCC service deregistration in an embodiment of the present invention. The flowchart includes the following steps:

Step 801: A user A is deregistered on the BOSS. This step may be performed by an operator or a user.

Step 802: The BOSS transfers deregistration information of the user A to the SCPvcc.

The interface or protocol between the BOSS and the SCPin or SCPvcc is the interface or protocol of the existing network.

Step 803: The SCPvcc deregisters the user A.

Step 804: If the user A has subscribed to any other IN service, the BOSS sends the SCPin address of the user A to the HLR; otherwise, the BOSS sends a null value to the HLR.

Step 805: The HLR modifies the address of the SCP of the user A.

The technical solution provided in the embodiments of the present invention has at least the following merits: The new SCPvcc is used to support the VCC service, thus implementing the VCC service for all mobile users, simplifying the interconnection with devices of the existing network, decreasing upgrades or modifications on devices of the existing network, and reducing the impact on services of the existing network.

Through the foregoing embodiments, it is understandable to those skilled in the art that the embodiments of the present invention may be implemented through software and a necessary general hardware platform or through hardware only. However, in most cases, software and a general hardware platform are preferred. Based on such understandings, the technical solution of the present invention or contributions to the prior art may be embodied by software products. The software products are stored in a storage medium and incorporate several instructions to instruct a terminal device, for example, a mobile phone, a personal computer, a server, or a network device, to execute the method provided by each embodiment of the present invention.

Although the invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall within the protection scope defined by the following claims or their equivalents.

What is claimed is:

1. A method for implementing a Voice Call Continuity (VCC) service, comprising:
   receiving an Initial Detection Point (IDP) message from a Mobile Switching Center (MSC);
   querying whether an address of a Service Control Point (SCP) of a user is null;
   when the address of the SCP is not null, sending the IDP message to the SCP and interacting with the SCP; and
   detecting whether a subsequent message from the SCP is a Connect or Continue message; when the subsequent message from the SCP is a Connect or Continue message, copying the Connect or Continue message to a new Connect message and sending the new Connect message to the MSC for implementing the VCC service.

2. The method of claim 1, wherein the step of querying whether the address of the SCP of the user is null comprises:
   querying a database to determine whether the address of the SCP of the user is null.

3. The method of claim 1, after the step of querying whether the address of the SCP of the user is null, further comprising:
   sending a Connect message to the MSC for implementing the VCC service when the address of the SCP is null.

4. The method of claim 1, after the step of interacting with the SCP, further comprising:
   forwarding a subsequent message from the MSC to the SCP.

5. The method of claim 1, after the step of detecting whether the subsequent message from the SCP is the Connect or Continue message, further comprising:
   forwarding the subsequent message from the SCP to the MSC when the subsequent message is not the Connect or Continue message.

6. The method of claim 1, before the step of receiving the IDP message from the MSC, further comprising:
   receiving subscription information and the address of the SCP of the user from a Business & Operation Support System (BOSS); and
   storing the address of the SCP of the user to a database.

7. A network device, comprising:
   a querying module, configured to query whether an address of a Service Control Point (SCP) of a user is null;
   a sending module, configured to send an Initial Detection Point (IDP) message to the SCP when the querying module finds that the address of the SCP is not null;

a detecting module, configured to detect whether a subsequent message sent from the SCP is a Connect or Continue message; and a copying module, configured to copy the Connect or Continue message to a new Connect message sent to a Mobile Switching Center (MSC) when the detecting module detects that the subsequent message sent from the SCP is the Connect or Continue message, so as to implement a Voice Call Continuity (VCC) service.

8. The network device of claim 7, further comprising:

a first forwarding module, configured to forward a subsequent message from the MSC to the SCP.

9. The network device of claim 7, further comprising:

a second forwarding module, configured to forward the subsequent message from the SCP to the MSC when the detecting module detects that the subsequent message is not the Connect or Continue message.

10. The network device of claim 7, further comprising:

a receiving module, configured to receive subscription information and the address of the SCP of the user from a Business & Operation Support System (BOSS); and a storing module, configured to store the address of the SCP of the user received by the receiving module.

11. A network system, comprising a Mobile Switching Center (MSC), a Service Control Point for Voice Call Continuity (SCPvcc), and a Service Control Point (SCP), wherein:

the MSC is configured to: send an Initial Detection Point (IDP) message to the SCPvcc and receive a new Connect message from the SCPvcc;

the SCPvcc is configured to: receive the IDP message from the MSC; query whether an address of the SCP of a user is null, and when the address of the SCP is not null, send the IDP message to the SCP; detect whether a subsequent message from the SCP is a Connect or Continue message, and when the subsequent message from the SCP is the Connect or Continue message, copy the Connect or Continue message to the new Connect message and send the new Connect message to the MSC; and the SCP is configured to: receive the IDP message sent from the SCPvcc, and send the subsequent message to the SCPvcc according to the IDP message.

12. The network system of claim 11, wherein the SCP and the SCPvcc are set independently or integrated into one.

* * * * *